United States Patent
Hematy

(10) Patent No.: US 9,306,662 B1
(45) Date of Patent: Apr. 5, 2016

(54) OPTICAL ISOLATOR LIFE EXPANDER

(71) Applicant: Maxim Integrated Products, Inc., San Jose, CA (US)

(72) Inventor: Arman Hematy, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/140,754

(22) Filed: Dec. 26, 2013

Related U.S. Application Data

(60) Provisional application No. 61/811,375, filed on Apr. 12, 2013.

(51) Int. Cl.
*H04B 10/00* (2013.01)
*H04B 10/075* (2013.01)

(52) U.S. Cl.
CPC .................. *H04B 10/075* (2013.01)

(58) Field of Classification Search
CPC ...... H04B 10/802; H04B 1/48; H04B 10/075; H04B 10/40; H04B 10/43; H04B 10/564; H04B 10/504; H04B 10/5057; H04B 10/1123; H04N 9/3155; G02B 6/4246; G02B 21/2033; G02B 21/2053; H03F 2200/331
USPC ............... 398/208, 209, 210, 25, 37, 38, 140, 398/154, 155, 128, 135–139, 162, 163, 195, 398/197
See application file for complete search history.

(56) References Cited

U.S. PATENT DOCUMENTS

| | | | | |
|---|---|---|---|---|
| 5,822,099 A * | 10/1998 | Takamatsu | ......... | H04B 10/1127 398/107 |
| 6,990,155 B2 * | 1/2006 | Adachi | .................... | H03F 3/24 375/261 |
| 7,369,067 B2 * | 5/2008 | Kishi | ..................... | H03M 5/08 341/53 |

(Continued)

OTHER PUBLICATIONS

Data Sheet—HCPL-7860/HCPL-786J; Optically Isolated Sigma-Delta (S-D) Modulator; Avago Technologies; pp. 1-18.

(Continued)

*Primary Examiner* — Hibret Woldekidan
(74) *Attorney, Agent, or Firm* — Advent, LLP

(57) ABSTRACT

A system includes a light emitting device on a first side of electrically isolated circuitry for transmitting an optical signal to a second side of the electrically isolated circuitry. The system also includes a driver for driving the light emitting device at an operational characteristic. The system further includes an optical receiver on the second side of the electrically isolated circuitry for receiving the optical signal from the light emitting device. The system also includes a sensor coupled with the optical receiver for sampling the intensity of the optical signal received by the optical receiver. The sensor is communicatively coupled with the driver and configured to transmit the sampled intensity of the optical signal received from the light emitting device to the driver, and the driver is configured to adjust the operational characteristic of the light emitting device based upon the sampled intensity of the optical signal.

17 Claims, 3 Drawing Sheets

(56) References Cited

U.S. PATENT DOCUMENTS

| | | | | | |
|---|---|---|---|---|---|
| 7,526,206 | B1* | 4/2009 | Rolenz | ............... | H04B 10/1121 398/140 |
| 8,229,313 | B2* | 7/2012 | Oh | ............... | G03G 15/0131 399/74 |
| 8,521,020 | B2* | 8/2013 | Welch | ............... | B82Y 20/00 398/193 |
| 8,592,742 | B2* | 11/2013 | Lorello et al. | ............... | 250/214 R |
| 8,692,200 | B2* | 4/2014 | Tao | ............... | G01J 1/28 250/338.4 |
| 9,000,675 | B2* | 4/2015 | Chang | ............... | H04L 27/10 315/201 |
| 2005/0070325 | A1* | 3/2005 | Bellaouar | ............... | H04B 1/30 455/550.1 |
| 2005/0213969 | A1* | 9/2005 | Hakomori | ............... | H04B 10/07953 398/33 |
| 2009/0142076 | A1* | 6/2009 | Li | ............... | H04B 10/61 398/208 |
| 2010/0328616 | A1* | 12/2010 | Silverstein | ............... | H04N 9/3129 353/31 |
| 2011/0243552 | A1* | 10/2011 | Mitchell | ............... | H04J 14/0227 398/14 |
| 2012/0175504 | A1* | 7/2012 | Holland | ............... | H04B 10/802 250/214 A |
| 2013/0039648 | A1* | 2/2013 | Uo | ............... | H04B 10/802 398/25 |

OTHER PUBLICATIONS

Data Sheet—ACPL-C797; Optically Isolated Sigma-Delta Modulator; Avago Technologies; pp. 1-16.

\* cited by examiner

OPTICAL ISOLATOR LIFE EXPANDER

CROSS-REFERENCE TO RELATED APPLICATIONS

The present application claims the benefit under 35 U.S.C. §119(e) of U.S. Provisional Application Ser. No. 61/811,375, filed Apr. 12, 2013, and titled "OPTICAL ISOLATOR LIFE EXPANDER," which is herein incorporated by reference in its entirety.

BACKGROUND

Industrial and process control systems include various types of control equipment used in industrial production, such as supervisory control and data acquisition (SCADA) systems, distributed control systems (DCS), and other control equipment using, for example, programmable logic controllers (PLC). These control systems are typically used in industries including electrical, water, oil, gas, and data. Using information collected from remote stations in the field, automated and/or operator-driven supervisory commands can be transmitted to field control devices. These field devices control local operations, such as the speed of an electrical motor. Industrial control systems/process control systems may require electrical isolation between power transmission and control equipment. For example, optical equipment can be used for signal transmission to electrically isolate devices, prevent ground loops, and so forth.

SUMMARY

A system includes a light emitting device on a first side of electrically isolated circuitry for transmitting an optical signal to a second side of the electrically isolated circuitry. The system also includes a driver for driving the light emitting device at an operational characteristic. The system further includes an optical receiver on the second side of the electrically isolated circuitry for receiving the optical signal from the light emitting device. The system also includes a sensor coupled with the optical receiver for sampling the intensity of the optical signal received by the optical receiver. The sensor is communicatively coupled with the driver and configured to transmit the sampled intensity of the optical signal received from the light emitting device to the driver, and the driver is configured to adjust the operational characteristic of the light emitting device based upon the sampled intensity of the optical signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
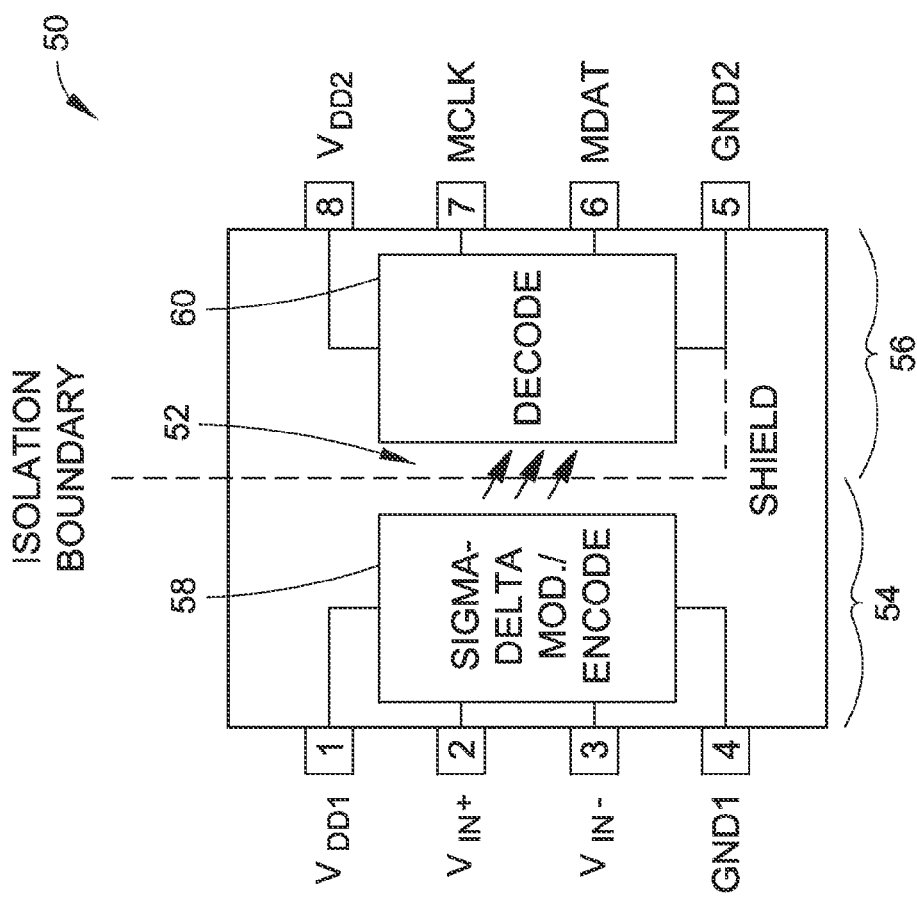
FIG. 1 is a diagrammatic illustration of a system that provides electrical isolation using an optical link.

Referring generally to FIG. 1, a system 50 providing optical coupling is described. The system 50 includes a unidirectional optical link 52 that provides communication (e.g., from a first side 54 of the system 50 to a second side 56 of the system 50). On the first side 54, a sigma-delta modulator/encoder 58 is used to furnish, for example, a clock signal, which is transmitted to a decoder 60 on the second side 56 via the optical link 52. In the configuration shown in FIG. 1, the optical link 52 is generally subject to an unpredictable life span. For example, as a typical light emitting diode (LED) ages, the signal strength from the LED gradually diminishes until it is no longer detectable by associating receiving hardware. Thus, in an industrial environment, such as a factory, optical links are typically replaced periodically in an attempt to avoid operational failure (e.g., at between five (5) and six (6) years of operation). However, in some cases an optical link may still be functional when it is replaced, while in other cases an optical link may fail before it is replaced.

Figure 2:
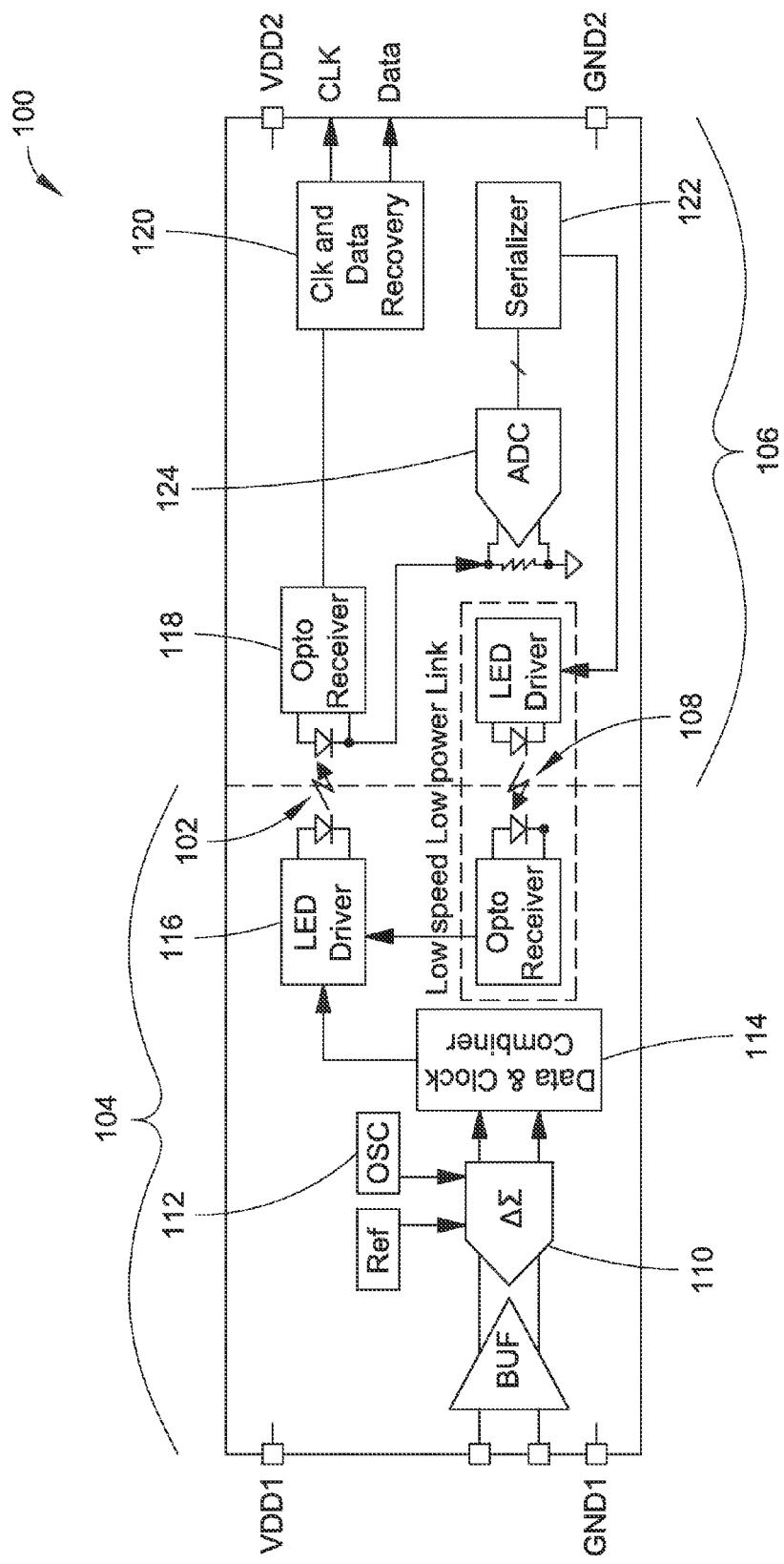
FIG. 2 is a diagrammatic illustration of a system that provides electrical isolation using an optical link, where the system implements a feedback loop to adjust one or more operational characteristics of an LED in accordance with an example embodiment of the present disclosure.
Figure 3:
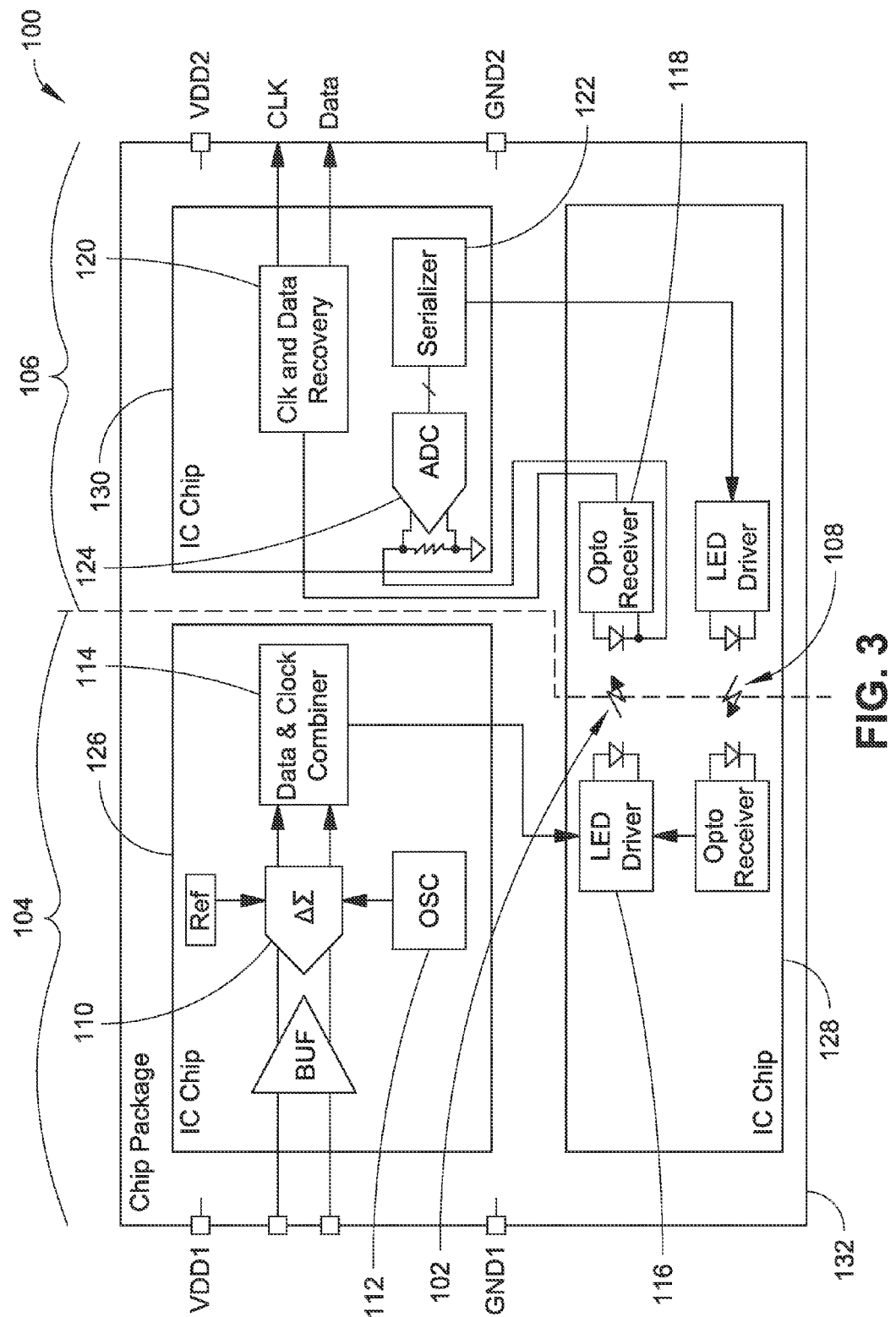
FIG. 3 is a diagrammatic illustration of a chip package that provides electrical isolation using an optical link, where the system implements a feedback loop to adjust one or more operational characteristics of an LED in accordance with an example embodiment of the present disclosure.

Referring generally to FIGS. 2 and 3, a system 100 providing optical coupling is described. The system 100 includes a first unidirectional optical link 102 (e.g., a high speed twenty megahertz (20 MHz) optical link) for transmitting signals from a first side 104 of the system 100 (e.g., a high voltage side) to a second side 106 of the system 100 (e.g., a low voltage side). The system 100 also includes a second unidirectional optical link 108 (e.g., a low speed, low power ten kilohertz (10 kHz) optical link) for transmitting signals from the second side 106 to the first side 104. In embodiments of the disclosure, one or more of the optical links 102 and 108 includes an LED. In some embodiments, one side of the system 100 (e.g., the high voltage side 104) is configured to couple with, for example, a motor, and the other side of the system 100 (e.g., the low voltage side 106) is configured to couple with, for example, a controller (e.g., for controlling the speed of the motor). In some embodiments, the high voltage side 104 is coupled with a floating ground. On the first side 104 of the system 100, a sigma-delta modulator 110 and an associated oscillator 112 are used to provide a clock signal to data clock and combiner circuitry 114. The clock signal is transmitted to an LED driver 116 and then to an LED on the first side 104 of the system 100. The clock signal is optically transmitted from the LED to an optical receiver 118 on the second side 106 of the system 100, and then to clock and data recovery circuitry 120, serializer circuitry 122, and so forth.

In embodiments of the disclosure, a current sensor (e.g., a current sensor and digitizer such as an analog-to-digital (ADC) converter) on the second side 106 of the system 100 is used to monitor the strength of the optical link 102 on the first side 104 of the system. As shown, an analog-to-digital converter 124 is coupled with the optical receiver 118 to sample (e.g., detect and/or measure) the current produced in, for example, a current generating diode of the optical receiver 118 on the second side 106 of the system 100, which is indicative of the received light intensity of the LED on the first side 104 of the system 100. The detected or measured current is then used to adjust one or more operational characteristics (e.g., duty cycle, signal intensity, and so forth) of the LED on the first side 104 of the system 100. For example, at the beginning of the life cycle of the system 100, the duty cycle is ten percent (10%). As the LED on the first side 104 of the system 100 ages, the duty cycle can be adjusted to twenty percent (20%), thirty percent (30%), and so forth.

In embodiments of the disclosure, the sampled current is provided to the LED driver 116 on the first side 104 of the system 100 and used to adjust (e.g., optimize) the duty cycle "ON" time (e.g., pulse width) of the transmitting LED on the first side 104 of the system 100. In this manner, the system 100 implements a dynamic "ON" time duty cycle transformer using a feedback servo loop. In other embodiments, the sampled current is provided to the LED driver 116 and used to adjust the amplitude (e.g., signal intensity) of the transmitting LED on the first side 104 of the system 100. In still further embodiments, the sampled current is provided to the LED driver 116 and used to adjust the amplitude and the duty cycle of the transmitting LED on the first side 104 of the system 100. In embodiments of the disclosure, an increased useful transmitter life is achieved while maintaining the integrity of the optical link 102 (e.g., with respect to the configuration described with reference to FIG. 1). For example, the optical link 102 can be operated for shorter periods of time at the beginning of its operational life span when the duty cycle does not have to be increased to account for a decrease in signal intensity experienced by an LED as it ages. Further, as the duty cycle is increased during the aging process of an LED, the optical link 102 can be used longer than it would ordinarily be in a typical configuration.

In some embodiments, current produced in current generating circuitry on the second side 106 of the system 100 is sampled and/or provided continuously. Similarly, one or more operational characteristics of the LED on the first side 104 of the system 100 can be adjusted continuously (e.g., in response to the sampled current). In other embodiments, current is sampled and/or provided periodically (e.g., each second, daily, monthly, yearly, and so forth). Similarly, one or more operational characteristics of the LED on the first side 104 of the system 100 can be adjusted periodically (e.g., in response to the sampled current). Further, a sampled current value can be compared to a previously sampled value to adjust an operational characteristic of the LED on the first side 104 of the system 100. For example, the system 100 provides a difference between a sampled current value and a previously sampled current value. The difference is then used to adjust the duty cycle of the LED on the first side 104 of the system 100. In some embodiments, the difference is determined using a comparator included with the system 100. In embodiments of the disclosure, a comparison is determined between a sampled current value and a pre-determined threshold current value, which can be determined based upon, for instance, a bit slice level.

In some embodiments, other circuitry is communicatively coupled with the system 100 shown in FIG. 2. For instance, in some embodiments the system 100 includes one or more additional unidirectional optical links that provide bidirectional communication (e.g., between a high voltage side and a low voltage side of the system). On the high voltage side, current-sense functionality is provided using the sigma-delta modulator 110 and the oscillator 112. Synchronization of the oscillator 112 is achieved via a "backwards" optical link that furnishes a clock signal from the low voltage side to the high voltage side. In some embodiments, the clock signal used on the backwards optical path is provided by, for instance, an external master clock. It should be noted that in one or more of these configurations, current is also sampled on the first side 104 of the system 100, and the sampled current is provided to an LED driver on the second side 106 of the system 100 and used to adjust (e.g., optimize) the duty cycle "ON" time (e.g., pulse width) of the transmitting LED on the second side 106 of the system 100.

Referring now to FIG. 3, in some embodiments the sigma-delta modulator 110, the oscillator 112, and the data and clock combiner circuitry 114 are provided on a first integrated circuit (IC) chip 126; the LED drivers, LEDs, and optical receiver circuitry of the optical links 102 and 108 are provided on a second optical isolator IC chip 128; and the ADC converter 124, serializer 122, and clock and data recovery circuitry 120 are provided on a third IC chip 130. The first, second, and third IC chips 126, 128, and 130 are included in a single chip package 132. Further, one or more pins can be included with the third IC chip 130 and/or a chip package for supplying an indication of signal intensity of the light received from the LED, and/or a comparison of signal intensity to a previously sampled signal intensity, a threshold value, and so forth. However, this configuration is provided by way of example only and is not meant to limit the present disclosure. Thus, in other configurations, the circuitry described is included on a single IC chip, is arranged differently on multiple IC chips, and so forth.

In embodiments of the disclosure, systems 100 described herein are used in one or more applications including, but not necessarily limited to: a programmable logic controller (PLC), a motor controller, a medical device, a photovoltaic (PV) solar device, a direct current-to-direct current (DC-to-DC) power inverter, and so forth. For example, the system described with reference to FIGS. 2 and 3 can be implemented in industrial (e.g., industrial control) and/or automation markets.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising: a light emitting diode on a first side of electrically isolated circuitry for transmitting an optical signal to a second side of the electrically isolated circuitry; a driver for driving the light emitting diode with an "ON" time; an optical receiver on the second side of the electrically isolated circuitry for receiving the optical signal from the light emitting diode; a sensor coupled with the optical receiver for sampling the intensity of the optical signal received by the optical receiver, wherein the sensor is communicatively coupled with the driver and configured to transmit the sampled intensity of the optical signal received from the light emitting diode to the driver, and the driver is configured to adjust the "ON" time based upon the sampled intensity of the optical signal; and a sigma-delta modulator and an oscillator disposed on the first side of the electrically isolated circuitry and configured to provide a clock signal to the light emitting diode.

2. The system as recited in claim 1, further comprising an optical link communicatively coupling the sensor with the driver.

3. The system as recited in claim 1, further comprising clock and data recovery circuitry disposed on the second side of the electrically isolated circuitry and configured to receive the clock signal.

4. The system as recited in claim 1, wherein the sensor comprises a current sensor.

5. The system as recited in claim 4, wherein the current sensor comprises an analog-to-digital converter.

6. The system as recited in claim 1, wherein the "ON" time comprises a pulse width of the light emitting diode.

7. The system as recited in claim 1, wherein the driver is configured to adjust an amplitude of the light emitting diode based upon the sampled intensity of the optical signal.

8. A system comprising: a light emitting device on a first side of electrically isolated circuitry for transmitting an optical signal to a second side of the electrically isolated circuitry; a driver for driving the light emitting device with an "ON" time; an optical receiver on the second side of the electrically isolated circuitry for receiving the optical signal from the light emitting device; a current sensor coupled with the optical receiver for sampling the intensity of the optical signal received by the optical receiver; an optical link communicatively coupling the sensor with the driver, wherein the sensor is configured to transmit the sampled intensity of the optical signal received from the light emitting device to the driver, and the driver is configured to adjust the "ON" time based upon the sampled intensity of the optical signal; and a sigma-delta modulator and an oscillator disposed on the first side of the electrically isolated circuitry and configured to provide a clock signal to the light emitting device.

9. The system as recited in claim 8, further comprising clock and data recovery circuitry disposed on the second side of the electrically isolated circuitry and configured to receive the clock signal.

10. The system as recited in claim 8, wherein the current sensor comprises an analog-to-digital converter.

11. The system as recited in claim 8, wherein the "ON" time comprises a pulse width of the light emitting device.

12. The system as recited in claim 8, wherein the operational characteristic comprises an amplitude of the light emitting device.

13. A chip package comprising:
a first integrated circuit chip comprising a light emitting device on a first side of electrically isolated circuitry for transmitting an optical signal to a second side of the electrically isolated circuitry, a driver for driving the light emitting device with an "ON" time, and an optical receiver on the second side of the electrically isolated circuitry for receiving the optical signal from the light emitting device;
a second integrated circuit chip comprising a sensor coupled with the optical receiver for sampling the intensity of the optical signal received by the optical receiver, wherein the sensor is communicatively coupled with the driver and configured to transmit the sampled intensity of the optical signal received from the light emitting device to the driver, and the driver is configured to adjust the "ON" time based upon the sampled intensity of the optical signal and
a third integrated circuit chip comprising a sigma-delta modulator and an oscillator disposed on the first side of the electrically isolated circuitry and configured to provide a clock signal to the light emitting device.

14. The chip package as recited in claim 13, wherein the second integrated circuit chip further comprises clock and data recovery circuitry disposed on the second side of the electrically isolated circuitry and configured to receive the clock signal.

15. The chip package as recited in claim 13, wherein the sensor comprises a current sensor.

16. The chip package as recited in claim 13, wherein the "ON" time comprises a pulse width of the light emitting device.

17. The chip package as recited in claim 13, wherein the driver is configured to adjust an amplitude of the light emitting device based upon the sampled intensity of the optical signal.

\* \* \* \* \*